June 13, 1933.  A. J. HOLMAN  1,913,389
OBJECTIVE FOR PHOTOGRAPHIC AND PROJECTION PURPOSES
Filed Feb. 8, 1930
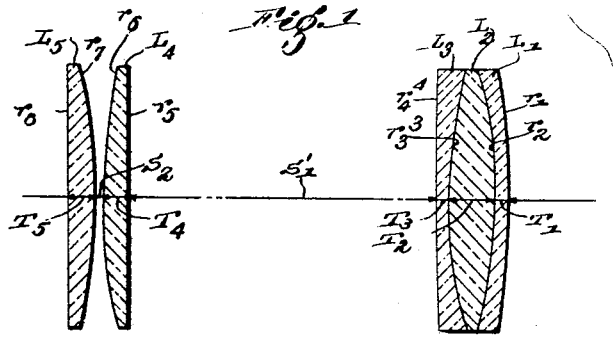
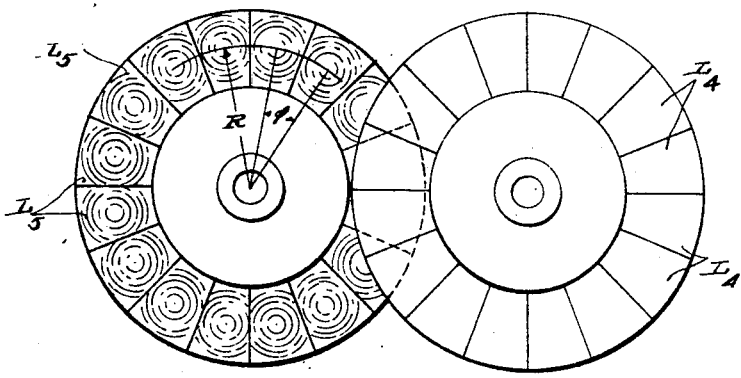
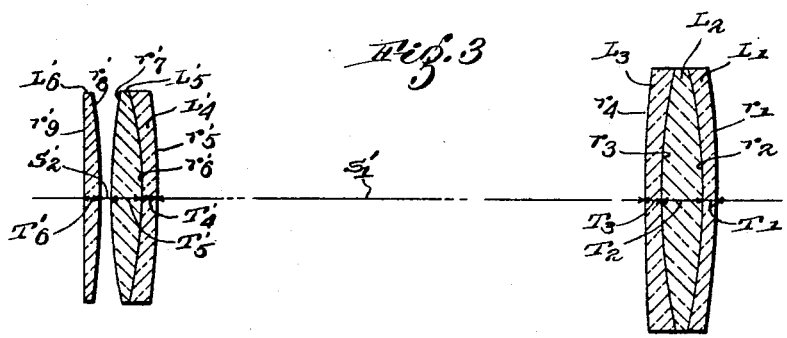
Inventor
Arthur J. Holman
by Franklin T. Phillips Jr
His Attorney.

Patented June 13, 1933

1,913,389

UNITED STATES PATENT OFFICE

ARTHUR J. HOLMAN, OF BROOKLINE, MASSACHUSETTS

OBJECTIVE FOR PHOTOGRAPHIC AND PROJECTION PURPOSES

Application filed February 8, 1930. Serial No. 427,036.

My invention relates to objectives for photographic and projection purposes and more particularly to objectives for cinematographic projectors of both the continuous or optical rectifying type, such as described in my United States Patent 1,584,098 of May 11, 1926, and the intermittent type. The special object of my invention has been to provide an improved type of objective which will have the largest possible aperture and at the same time permit a more nearly perfect correction for spherical and chromatic aberration, astigmatism, flatness of field, distortion and coma, than is possible in the present types of objectives. My improved objective will provide the maximum screen brilliancy and uniformly excellent definition over the entire screen area, a condition which is not possible with the Petzval and anastigmat triplet types, and moreover these results can be obtained equally well with the higher angular aperture illuminating system of the reflector arc.

In projectors of the continuous type referred to above, in which the transition, from picture to picture on the film strip, takes place through a dissolving action, it is absolutely necessary to eliminate all distortion in order to secure the critical definition required in cinematographic projection. My new objective is corrected to remove all distortion and hence is especially effective in improving the definition of continuous projectors.

The objectives used in present day intermittent projectors are generally of the modified Petzval type for the reason that a relatively large aperture may be used and thus a greater screen brilliancy can be obtained, but this type of objective cannot be fully corrected simultaneously for astigmatism and flatness of field, and therefore uniform definition cannot be secured over the entire screen area. While the lack of critical definition as such, is not noticeable to the average theatre patron, nevertheless when witnessing a comparison test with present objectives and my improved objective, an average group will note the improved quality and "apparent roundness" which are characteristic of pictures projected with my objective.

My objective may be best understood by referring to the drawing in which:

Fig. 1 shows a horizontal section of the lens elements comprising my improved objective as applied to a continuous projector of the revolving lens wheel type.

Fig. 2 shows a pair of overlapping revolving lens wheels of the sort employed in a continuous projector, the lenses on which successively form the rear elements of my improved objective.

Fig. 3 shows a section of the lens elements comprising my improved objective as assembled for present day projectors of the intermittent type.

The requirements for the proper functioning of an optical system used in the continuous projector described in my United States Patent 1,584,098 of May 11, 1926, are met when the optical system is designed in accordance with the following formulæ:

$$f = f_2 \left( \frac{z-x}{z} \right)$$

$$D = f_1 \frac{x}{z}$$

$$C = \frac{di \cdot f_2}{di - f_2} - f_1 \left( \frac{x}{z-x} \right)$$

wherein $f$ = equivalent focus of the complete objective.

$D$ = axial distance from film strip on aperture plate to the point midway between revolving lens wheel elements.

C = axial distance from the point midway between revolving lens wheel elements to the equivalent center of the front element of the objective.

$f_1$ = equivalent focal length of a pair of revolving lens wheel elements.

$f_2$ = equivalent focal length of the front element of the objective.

$di$ = distance from equivalent center of objective to center of screen.

$X = \frac{1}{2}$ the distance between centers of film pictures.

$$Z = R \sin \frac{\phi}{2};$$

R being the radius of the circle on which the optical centers of the revolving lens wheel elements are located, and $\phi$ being the angle at the center of the revolving lens wheels included between the radii through the optical centers of a pair of adjacent elements (see Fig. 2.)

It is to be noted that the above formulæ limit the design of the objective only to the extent of fixing the focal lengths of the front and rear components and their relative spacing with respect to the aperture plate of the projector, and in all other respects the designer is entirely free to use whatever combinations of glass and radii of curvature he deems necessary to secure the proper corrections.

Various methods are employed to calculate the corrections for objectives and nearly all persons and organizations skilled in the art have their own formulæ and systems for determining the relative values of the residual errors which in their opinions will yield the best objectives, and inasmuch as the above formulæ, which are peculiar to the revolving lens wheel system, allow sufficient latitude for the application of the usual mathematics for lens correction, it will not be necessary to elaborate on that subject.

Referring now to the drawing, Fig. 1 represents diagrammatically the elements included in my preferred design of an objective for a continuous projector, wherein the front element consists of three lenses $L_1$, $L_2$ and $L_3$ which are cemented together and the rear elements are the lenses $L_4$ and $L_5$ which are mounted on the revolving lens wheels as illustrated in Fig. 2. The curvatures of the lens surfaces are indicated by $r_1, r_2, r_3, r_4, r_5, r_6, r_7,$ and $r_8$, the thickness of the lenses by $T_1, T_2, T_3, T_4$ and $T_5$ and the separation by $S_1$ and $S_2$. The table below gives the numerical values of the foregoing as well as the optical characteristics of the glass used for my preferred objective having an aperture of F/2.7, an equivalent focal length of 173.5 and a back focus of 108.

Table I

| Lens | Focal length | Radii | Thickness and separation | Glass | |
|---|---|---|---|---|---|
| | | | | $N_d$ | $v$ |
| $L_1$ | | $r_1 = 139.5$ | $T_1 = 4.0$ | 1.6228 | 36.1 |
| | | $r_2 = 93.0$ | | | |
| $L_2$ | 254 | $r_2 = 93.0$ | $T_2 = 11.5$ | 1.5230 | 58.0 |
| | | $r_3 = 93.0$ | | | |
| $L_3$ | | $r_3 = 93.0$ | $T_3 = 3.5$ | 1.6228 | 36.1 |
| | | $r_4 = 385.0$ | | | |
| | | | $S_1 = 74.5$ | | |
| $L_4$ | 711.3 | $r_5 = \infty$ | $T_4 = 4.8$ | 1.5230 | 58.0 |
| | | $r_6 = 372$ | | | |
| | | | $S_2 = 1.0$ | | |
| $L_5$ | 711.3 | $r_7 = 372$ | $T_5 = 4.8$ | 1.5230 | 58.0 |
| | | $r_8 = \infty$ | | | |

The index of refraction of the glass is given for the D line under $N_d$ and the dispersive characteristic under $v$.

It is to be noted particularly that the lenses $L_4$ and $L_5$ are identical and they are positioned so that their curved surfaces are adjacent.

Although the drawing and the above table show the front element made up of a cemented triplet in my preferred objective, it is to be understood that a two part cemented element may also be used provided it is properly over corrected chromatically to compensate for the uncorrected rear elements, and therefore my claims are not to be construed as limited to the use of a triplet for the front element of my objective.

In applying the principles of my improved objective to a design suitable for use in projectors which do not employ revolving lens wheels, it is to be noted that the designer is entirely free to use whatever values he deems best for the focal lengths of the elements and their relative positioning with respect to the projector aperture plate. A relatively long back focus is not disadvantageous in the revolving lens wheel type of continuous projector because of the special character of the condenser system employed by that device. On the other hand, because of the rapid divergence of the light beam after passing through the aperture plate and because of the restricted diameter of the lens tube mounting in some projectors, it is advantageous to make the back focus of my preferred objective relatively short, for projectors not employing revolving lens wheels. This involves the use of relatively shorter focus rear elements and it becomes necessary to chromatically over correct one of these elements in order to make the complete objective achromatic.

Fig. 3 of the drawing shows diagrammatically the elements included in my preferred design of an objective for present day projectors, wherein the front element consists of three lenses $L_1$, $L_2$, and $L_3$ which are cemented together, and the rear elements are the lenses $L'_4$ and $L'_5$ comprising a cemented doublet and the lens $L'_6$. The curvature of the lens surfaces are indicated by $r_1$, $r_2$, $r_3$, $r_4$, $r'_5$, $r'_6$, etc., the thickness of the lenses by $T_1$, $T_2$, $T_3$, $T'_4$, $T'_5$ and $T'_6$ and the separation by $S'_1$ and $S'_2$.

The table below gives the numerical values of the foregoing as well as the optical characteristics of the glass used for my preferred objective having an aperture of F/2.7, an equivalent focal length of 171, and a back focus of 56.

Table II

| Lens | Focal length | Radii | Thickness and separation | Glass | |
|---|---|---|---|---|---|
| | | | | $N_d$ | $v$ |
| $L_1$ | | $r_1 = 139.5$ | $T_1 = 4.0$ | 1.6228 | 36.1 |
| | | $r_2 = 93.0$ | | | |
| $L_2$ | 254 | $r_2 = 93.0$ | $T_2 = 11.5$ | 1.5230 | 58.0 |
| | | $r_3 = 93.0$ | | | |
| $L_3$ | | $r_3 = 93.0$ | $T_3 = 3.5$ | 1.6228 | 36.1 |
| | | $r_4 = 385$ | | | |
| | | | $S'_1 = 142.7$ | | |
| $L'_4$ | | $r'_5 = 662.3$ | $T'_4 = 3.0$ | 1.6228 | 36.1 |
| | 376 | $r'_6 = 105.9$ | | | |
| | | $r'_6 = 105.9$ | | | |
| $L'_5$ | | $r'_7 = 196.6$ | $T'_5 = 6.0$ | 1.5230 | 58.0 |
| | | | $S'_2 = 1.0$ | | |
| $L'_6$ | 376 | $r'_8 = 196.6$ | $T'_6 = 3.5$ | 1.5230 | 58.0 |
| | | $r'_9 = \infty$ | | | |

The index of refraction of the glass is given for the D line under $N_d$ and the dispersive characteristic under $v$.

It is to be noted that the lenses $L'_5$ and $L'_6$ have equal curves on one side and these sides are placed adjacent. It is to be noted also that the front element is identical with that given in Fig. 1 and Table I and the statement made in regard to substituting a doublet for the triplet applies in this case also. The triplet is to be preferred, however, especially in objectives of the shorter focal lengths since this construction permits the use of relatively longer radius curves in the front element.

The main features which distinguish my improved objective from all others is the combination of a pair of rear elements, each having one convex surface of approximately the same curvature, the elements being so positioned that these surfaces are adjacent and separated by a small air gap, and each of said elements being of approximately equal focal length. Another feature is the use of a cemented triplet as the front element of my objective, this triplet being made up of a symmetrical crown between two non-symmetrical flint lenses, the outer surface of the rear flint having a radius of curvature greater than that of the convex surfaces of the rear elements and not less than twice the focal length of the complete objective.

Although I have shown my improved objective as constructed, primarily for cinematographic projection purposes, and as composed entirely of positive elements, it is to be understood that the basic principle can be applied to all objectives for photographic and projection purposes wherein the rear element is positive. The so-called anastigmat triplet photographic objectives which have a central dispersing member and a double convex rear element can be more highly corrected by substituting a pair of rear elements such as I have described.

Having thus fully described my invention, what I claim is:

1. An objective having a positive front element and a pair of positive rear elements, said rear elements each having a convex surface, said convex surfaces not differing in curvature by more than 20% and being placed adjacent each other and separated by an air gap smaller than the thickness of one of said rear elements, the spacing between said front element and the nearest rear element being not less than 20% nor greater than 85% of the equivalent focal length of the complete objective, the greater spacing occurring in objectives with short back focus.

2. An objective comprising a positive front element and a pair of positive rear elements, each of said rear elements being of approximately equal focal length and each having one surface of similar curvature, said surfaces being placed adjacent and separated by an air gap smaller than the thickness of one of said rear elements.

3. An objective comprising a positive front element and a pair of rear elements, said rear elements each having a convex surface of equal curvature and said convex surfaces being placed adjacent and separated by an air gap small compared to the space between said front and said rear elements.

4. An objective comprising a positive front element and a pair of rear elements, said front element consisting of a double convex crown lens cemented between two non-symmetrical flint lenses, the rear surface of said front element having a radius of curvature greater than twice the equivalent focus of the complete objective, said rear elements each consisting of a single plano-convex lens of equal focal length and being positioned with the convex surfaces adjacent, said convex surfaces being separated by an air gap smaller than the thickness of one of said rear elements.

5. An objective comprising a chromatically over-corrected front element and a pair of rear elements, said front element consisting of a symmetrical crown lens cemented between two non-symmetrical flint lenses, the rear surface of said front element having a radius of curvature greater than twice the focal length of the complete objective, said rear elements being identical plano-convex crown lenses having their convex surfaces placed adjacent and separated by a small air gap.

6. A highly corrected objective having a relatively short back focus comprising a positive front element and a pair of positive rear elements, each of said rear elements being of approximately equal focal length and each having a convex surface of equal curvature, said convex surfaces being placed adjacent and separated by a small air gap, one of said rear elements consisting of a single lens and the other of said rear elements being a chromatically over-corrected cemented doublet.

7. A highly corrected objective having a relatively short back focus comprising a positive front element and a pair of positive rear elements, said front element consisting of a double convex crown lens cemented between two non-symmetrical flint lenses, the rear surface of said front element having a radius of curvature greater than twice the focal length of the complete objective, said rear elements each having a convex surface, said convex surfaces differing in curvature by less than 20% and being placed adjacent and separated by a small air gap, one of said rear elements consisting of a single lens and the other of said rear elements being chromatically over-corrected and consisting of a double convex crown lens cemented to a flint lens.

8. A highly corrected objective having a relatively short back focus, comprising a positive front element and a pair of positive rear elements, said front element consisting of a symmetrical convex crown lens cemented between two non-symmetrical flint lenses, the rear surface of said front element having a radius of curvature greater than twice the focal length of the complete objective, said rear elements each having a convex surface of equal curvature, said convex surfaces being placed adjacent and separated by a small air gap, one of said rear elements being a plano-convex crown lens the plain side forming the rear surface of the complete objective, the other of said rear elements being a chromatically over-corrected cemented doublet and being positioned with the flint lens facing said front element.

9. An objective comprising positive front and rear elements, said front element consisting of a double convex crown lens cemented between two non-symmetrical flint lenses, the rear surface of said front element having a radius of curvature greater than twice the equivalent focus of the complete objective.

10. An objective comprising a chromatically over-corrected front element and a positive rear element, said front element consisting of a symmetrical crown lens cemented between two non-symmetrical flint lenses, the rear surface of said front element having a radius of curvature greater than twice the focal length of the complete objective.

ARTHUR J. HOLMAN.